United States Patent
Boyd et al.

(10) Patent No.: US 11,872,913 B1
(45) Date of Patent: Jan. 16, 2024

(54) CONFIGURABLE VEHICLE SEAT

(71) Applicant: Protomet Corporation, Oak Ridge, TN (US)

(72) Inventors: Stewart Boyd, Oak Ridge, TN (US); Brian Pitcher, Oak Ridge, TN (US)

(73) Assignee: Protomet Corporation, Oak Ridge, TN (US)

( * ) Notice: Subject to any disclaimer, the term of this patent is extended or adjusted under 35 U.S.C. 154(b) by 0 days.

(21) Appl. No.: 18/473,649

(22) Filed: Sep. 25, 2023

Related U.S. Application Data

(60) Provisional application No. 63/377,268, filed on Sep. 27, 2022.

(51) Int. Cl.
*B60N 2/12* (2006.01)
*B60N 2/22* (2006.01)

(52) U.S. Cl.
CPC ............. *B60N 2/12* (2013.01); *B60N 2/2209* (2013.01)

(58) Field of Classification Search
CPC ................................ B60N 2/12; B60N 2/2209
USPC ......................................................... 297/354.1
See application file for complete search history.

(56) References Cited

U.S. PATENT DOCUMENTS

| | | | | |
|---|---|---|---|---|
| 6,742,743 | B2 * | 6/2004 | Saint-Jalmes | B60N 2/3065 297/14 |
| 8,240,764 | B2 * | 8/2012 | Ropp | B60N 2/06 297/344.13 |
| 10,513,202 | B2 * | 12/2019 | Gumbrich | B60N 2/929 |
| 11,059,392 | B1 * | 7/2021 | Alexander | B60N 2/12 |

* cited by examiner

*Primary Examiner* — Mark R Wendell
(74) *Attorney, Agent, or Firm* — Robinson IP Law, PLLC

(57) ABSTRACT

Various implementations include a seat having a guide track, a base bracket, a first pivot arm, and a second pivot arm. The guide track includes an elongated track having a longitudinal centerline and one or more notches. The base bracket includes at least one laterally extending guide pin slidingly engaging the elongated track and disposable within the one or more notches. The first pivot arm is configured to support a forward cushion. The first pivot arm is rotatably coupled to the base bracket and movable between an upright position and a forward position. The second pivot arm is configured to support a rearward cushion. The second pivot arm is rotatably coupled to the base bracket and movable between an upright position and a rearward position.

20 Claims, 15 Drawing Sheets

CONFIGURABLE VEHICLE SEAT

FIELD

This disclosure relates to the field of vehicle seating. More particularly, this disclosure relates to a seat that is convertible into multiple positions on a vehicle, such as a boat.

BACKGROUND

Vehicles such as boats and other watercraft may feature a variety of seating arrangements for passengers riding in the vehicle. For example, a watercraft such as a wake or tow boat may include a seating area aft of the windshield of the watercraft. It may be desirable for seating areas within the watercraft to be oriented in a plurality of configurations depending on an activity being performed with the watercraft.

For example, during ordinary movement of the watercraft it may be desirable to include forward-facing seating for passengers riding on the watercraft. It may further be desirable to have rear-facing seating on the watercraft during activities, such as when the watercraft is used for wakeboarding or wake surfing. At other times, such as when the watercraft is stationary, it may be desirable to configure seating of the watercraft to provide areas for lounging or resting on the watercraft. Deck space may frequently be at a premium on a watercraft, and it may therefore be desirable to provide various configurations of seating for passengers without significantly consuming available deck space.

What is needed, therefore, is a seat that is capable of being arranged in a plurality of configurations on a vehicle.

SUMMARY

Various implementations include a seat. The seat includes a guide track, a base bracket, a first pivot arm, and a second pivot arm. The guide track includes an elongated track having a longitudinal centerline and one or more notches. The base bracket includes at least one laterally extending guide pin slidingly engaging the elongated track and disposable within the one or more notches. The first pivot arm is configured to support a forward cushion. The first pivot arm is rotatably coupled to the base bracket and movable between an upright position and a forward position. A longitudinal axis of the first pivot arm forms an oblique angle with the longitudinal centerline in the upright position and is substantially parallel to the longitudinal centerline in the forward position. The second pivot arm is configured to support a rearward cushion. The second pivot arm is rotatably coupled to the base bracket and movable between an upright position and a rearward position. A longitudinal axis of the first pivot arm forms an oblique angle with the longitudinal centerline in the upright position and is substantially parallel to the longitudinal centerline in the rearward position.

In some implementations, the guide track is a first guide track and the base bracket is a first base bracket. In some implementations, the seat further includes a second guide track and a second base bracket.

In some implementations, the at least one laterally extending guide pin includes at least two laterally extending guide pin. In some implementations, the at least two laterally extending pins are offset in a direction perpendicular to the longitudinal centerline.

In some implementations, the seat further includes a stop portion to prevent one of the first pivot arm or the second pivot arm from rotating beyond the forward position or the rearward position, respectively. In some implementations, the stop portion is defined by the base bracket.

In some implementations, the one or more notches includes two or more notches.

In some implementations, the elongated track is a channel defined by the guide track.

In some implementations, the forward cushion is rotatably supported by the first pivot arm. In some implementations, the forward cushion includes a cushioned surface and a table surface opposite the cushioned surface. In some implementations, the table surface includes a lip extending at least partially around an outer edge of the table surface. In some implementations, the table surface includes a substantially solid surface.

In some implementations, the seat further includes a cushion release assembly movable between a locked position and an unlocked position. In some implementations, the forward cushion is prevented from rotating relative to the first pivot arm in the locked position. In some implementations, the forward cushion is allowed to rotate relative to the first pivot arm in the unlocked position. In some implementations, the cushion release assembly includes a rotatable knob coupled to a cushion latch by a cable. In some implementations, the cushion latch is engaged with the first pivot arm in the locked position. In some implementations, the cushion latch is disengaged with the first pivot arm in the unlocked position. In some implementations, rotation of the knob causes the cushion release assembly to move between the locked position and the unlocked position.

In some implementations, the seat further includes a toggle assembly for releasably maintaining the first pivot arm and the second pivot arm in a position. In some implementations, the toggle assembly includes a rotatable toggle and a spring force for biasing the toggle to a neutral position. In some implementations, the toggle is urgable in either rotational direction. In some implementations, each of the first pivot arm and the second pivot arm define an indentation for engaging the toggle to retain the first pivot arm or the second pivot arm in the upright position.

In some implementations, rotation of one of the first pivot arm or the second pivot arm beyond the upright position moves the toggle assembly from a locked position to an unlocked position. In some implementations, the one of the first pivot arm or the second pivot arm is prevented from rotating toward the forward position or the rearward position, respectively, relative to the base bracket in the locked position. In some implementations, the one of the first pivot arm or the second pivot arm is allowed to rotate toward the forward position or the rearward position, respectively, relative to the base bracket in the unlocked position. In some implementations, when one of the first pivot arm or second pivot arm is in the upright position, the toggle assembly prevents the other of the second pivot arm or the first pivot arm from rotating toward the upright position In some implementations, the seat further includes a pivot arm latch movable between a locked position and an unlocked position. In some implementations, the first pivot arm or the second pivot arm is prevented from rotating relative to the base bracket in the locked position. In some implementations, the first pivot arm or the second pivot arm is allowed to rotate relative to the base bracket in the unlocked position.

In some implementations, when one of the first pivot arm or second pivot arm is in the upright position, the other of the second pivot arm or the first pivot arm is prevented from rotating toward the upright position.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Various implementations include a seat. The seat includes a guide track, a base bracket, a first pivot arm, and a second pivot arm. The guide track includes an elongated track having a longitudinal centerline and one or more notches. The base bracket includes at least one laterally extending guide pin slidingly engaging the elongated track and disposable within the one or more notches. The first pivot arm is configured to support a forward cushion. The first pivot arm is rotatably coupled to the base bracket and movable between an upright position and a forward position. A longitudinal axis of the first pivot arm forms an oblique angle with the longitudinal centerline in the upright position and is substantially parallel to the longitudinal centerline in the forward position. The second pivot arm is configured to support a rearward cushion. The second pivot arm is rotatably coupled to the base bracket and movable between an upright position and a rearward position. A longitudinal axis of the first pivot arm forms an oblique angle with the longitudinal centerline in the upright position and is substantially parallel to the longitudinal centerline in the rearward position.

Figure 1:
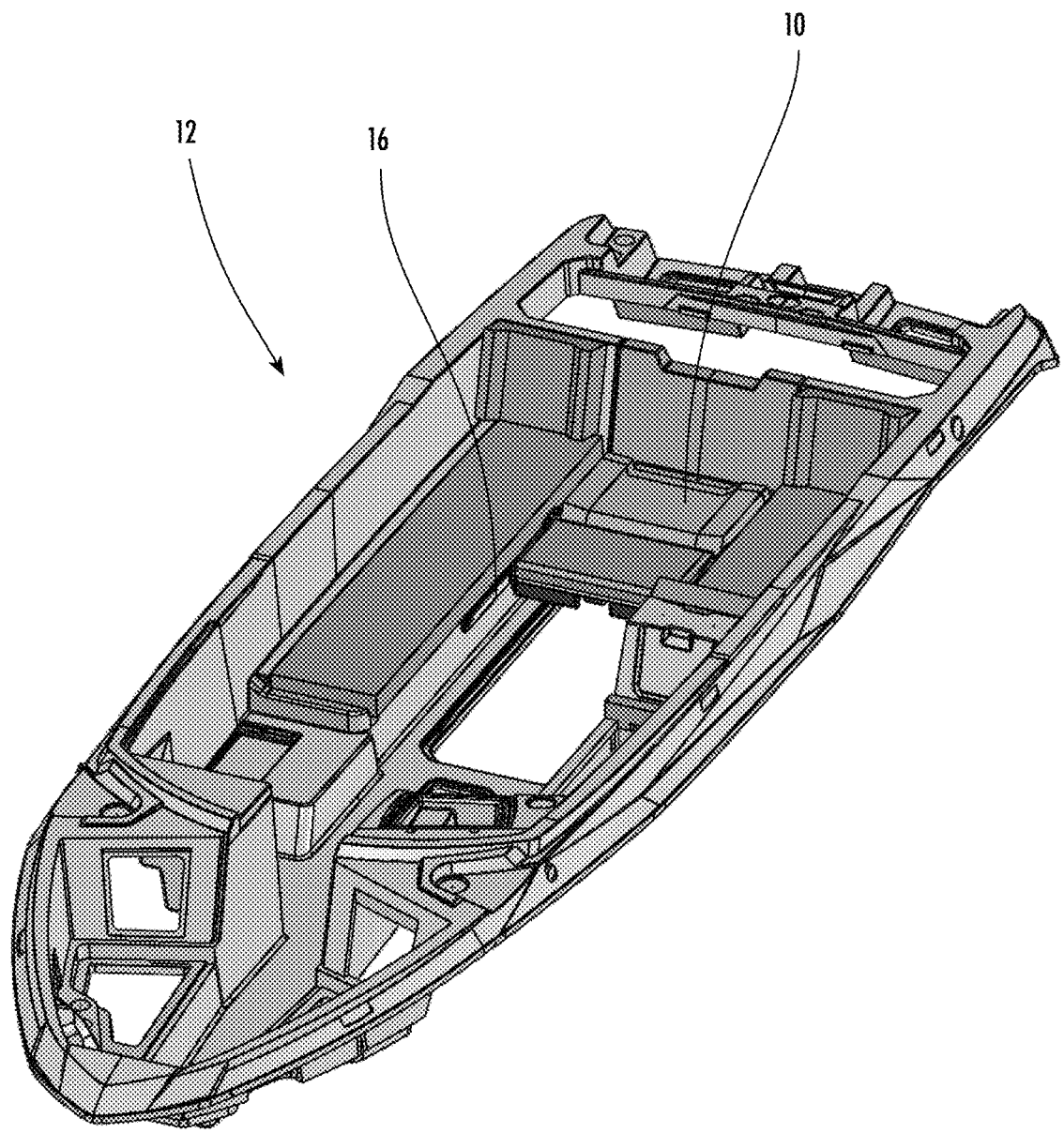
FIG. 1 shows a perspective view of a seat installed on a watercraft according to one aspect of the present disclosure.

FIG. 1 shows a seat 10 that is adapted to be converted into a plurality of configurations on a vehicle 12, such as a watercraft as shown in FIG. 1. The configurable seat is installed on the vehicle 12 such that the seat 10 may be configured to support passengers thereon in configurations that may include a front-facing seating position, a rear-facing seating position, and a substantially flat configuration such that the seat 10 may allow passengers to recline or lay down on the seat. The seat 10 may be readily converted to a plurality of configurations on the vehicle 12 such that the seat 10 may support passengers thereon during various activities or in various positions on the vehicle 12.

Figure 2:
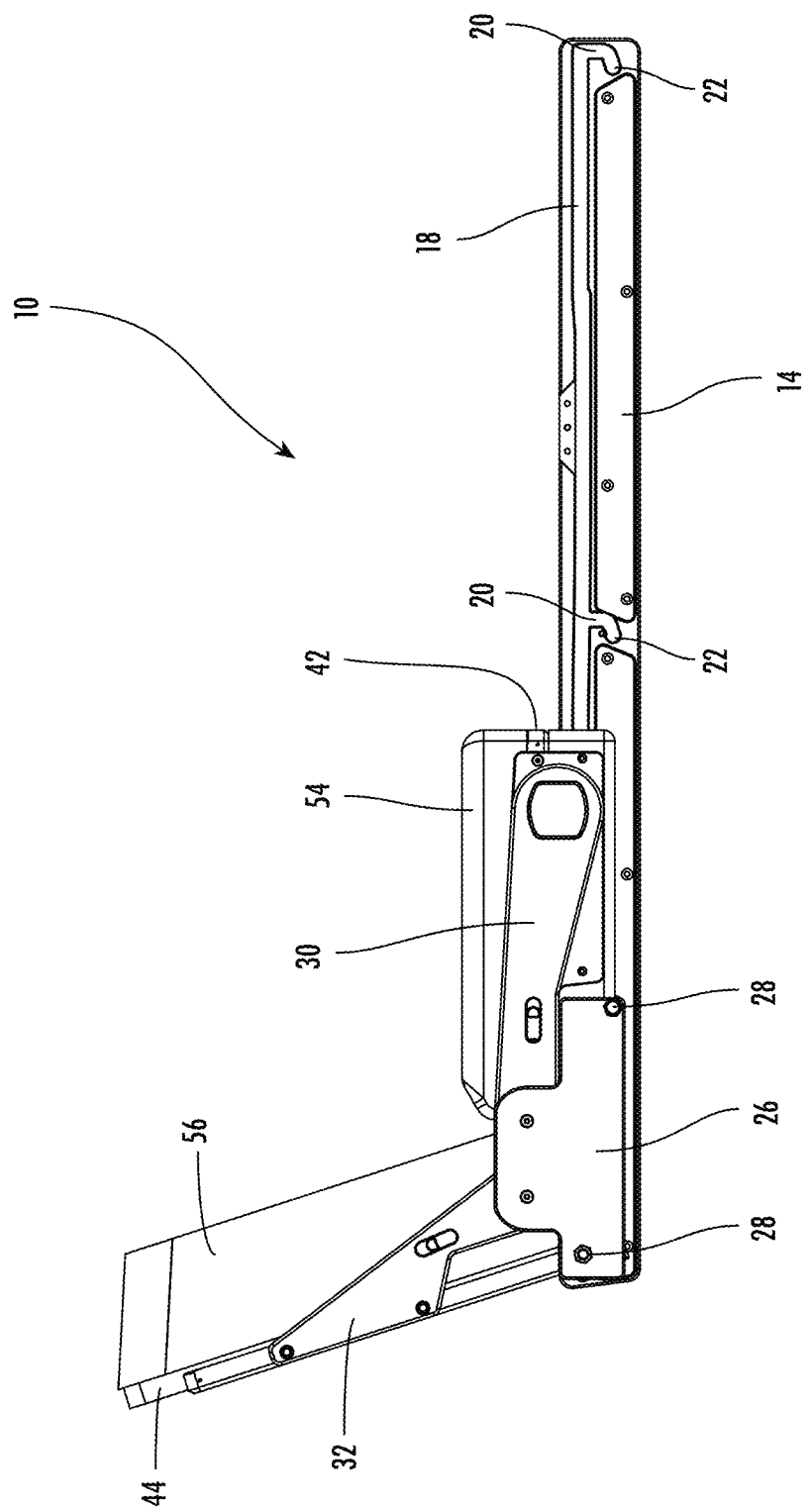
FIG. 2 shows a side view of a configurable seat in one of a plurality of configurations according to one aspect of the present disclosure.

FIG. 2 shows a side view of the seat 10 in one of a plurality of configurations. The seat 10 includes a port guide track 14 that is mounted on the vehicle 12 (FIG. 1). The seat further includes a starboard guide track 16 (FIG. 1) that is mounted on the vehicle 12 opposite of the port guide track 14. The port guide track 14 and the starboard guide track 16 may be substantially mirrored to each other such that the seat 10 may move along the port guide track 14 and the starboard guide track 16 as discussed in greater detail below. The port guide track 14 may be installed on the vehicle 12 towards a port or left-hand side of the vehicle 12. The starboard guide track 16 may be installed on the vehicle towards a starboard or right-hand side of the vehicle 12. The port guide track 14 and the starboard guide track 16 may be opposite and facing each other when installed on the vehicle 12 to support portions of the seat 10 on or between the port guide track 14 and the starboard guide track 16.

The starboard guide track 16 is omitted from the view of FIG. 2-FIG. 11 for the purpose of more clearly illustrating portions of the seat 10 as detailed herein. Although the following description refers to the port guide track 14, it is also understood that the starboard guide track 16 may be substantially the same as the port guide track 14. Referring to FIG. 2, each of the port guide track 14 and the starboard guide track 16 may include an elongate track 18 formed along a length of the port guide track 14 and the starboard guide track 16. The elongate track 18 extends substantially along a length of the port guide track 14 and the starboard guide track 16 from a portion of the port guide track 14 and the starboard guide track 16 that are towards a rear of the vehicle to a portion of the port guide track 14 and the starboard guide track 16 that are towards a front of the vehicle. The port guide track 14 and the starboard guide track 16 further include a plurality of notches 20 located along a length of the elongate track 18. The plurality of notches 20 are in communication with the elongate track 18 and may extend at an oblique angle relative to a longitudinal centerline of the elongate track 18 substantially downward relative to a gravitational axis during use. One or more of the plurality of notches 20 may further include an angled portion 22 that extends at an angle relative to the downward extending plurality of notches 20.

Figure 3:
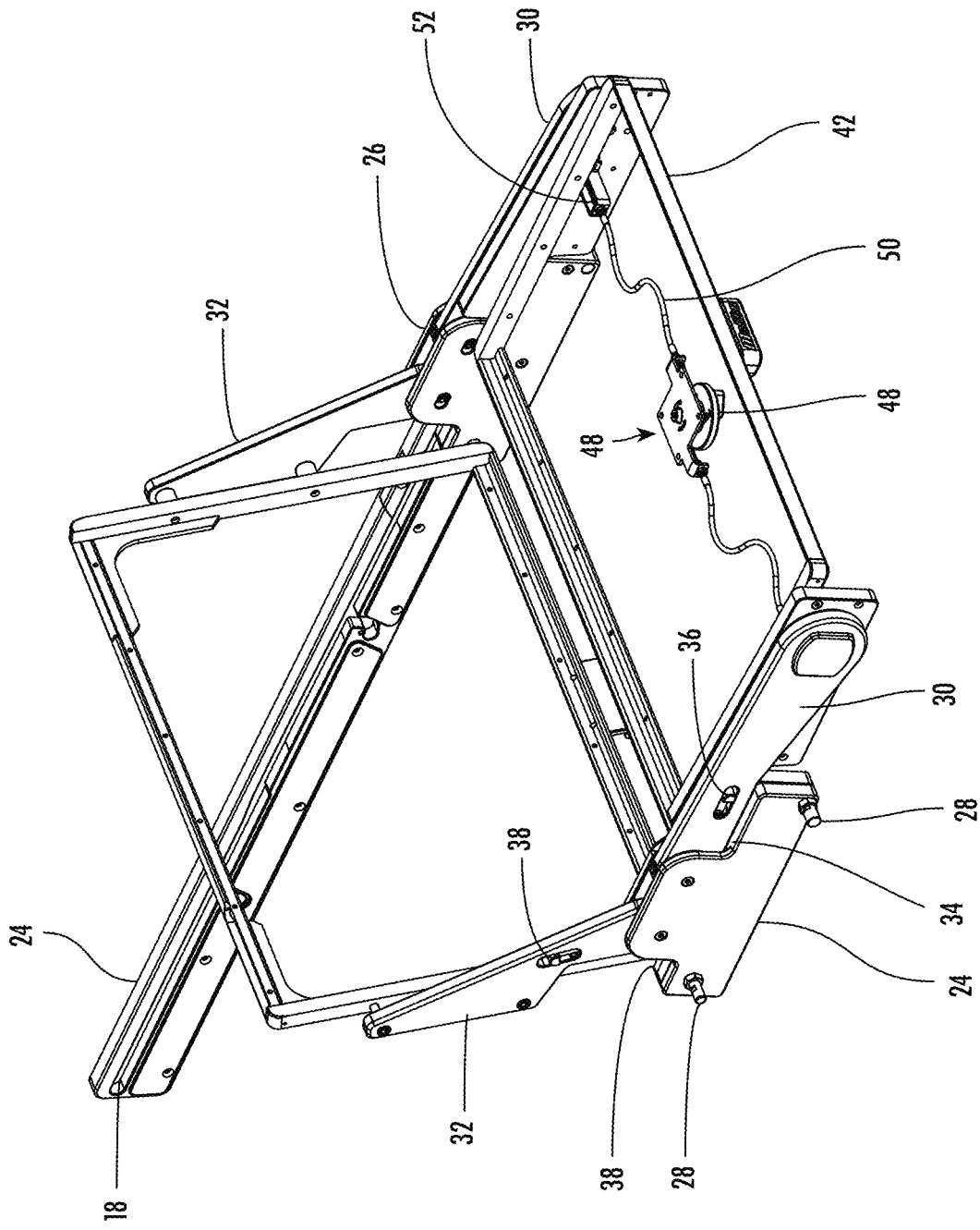
FIG. 3 shows a perspective view of a configurable seat in a forward-facing arrangement according to one aspect of the present disclosure.

Referring to FIG. 3, the seat 10 includes a port base bracket 24 and a starboard base bracket 26. The port base bracket 24 and the starboard base bracket 26 include a plurality of guide pins 28. The plurality of guide pins 28 may extend substantially laterally from the port base bracket 24 and the starboard base bracket 26 and are shaped to engage the starboard guide track 16 and the port guide track 14, respectively. The plurality of guide pins 28 may engage the port guide track 14 and the starboard guide track 16 such that the port base bracket 24 is slidably supported on the port guide track 14 and the starboard base bracket 26 is slidably supported on the starboard guide track 16. The plurality of guide pins 28 may be located on the port base bracket 24 and the starboard base bracket 26 such that the plurality of guide pins 28 extend laterally outward from the base bracket to engage the port base bracket 24 and the starboard base bracket 26. As shown in the figures, one of the plurality of guide pins 28 that is located towards a front of the port base bracket 24 and the starboard base bracket 26 may be positioned lower relative to the longitudinal centerline of the elongated track than one of the plurality of guide pins 28 located towards a rear of the port base bracket 24 and the starboard base bracket 26.

Figure 5:
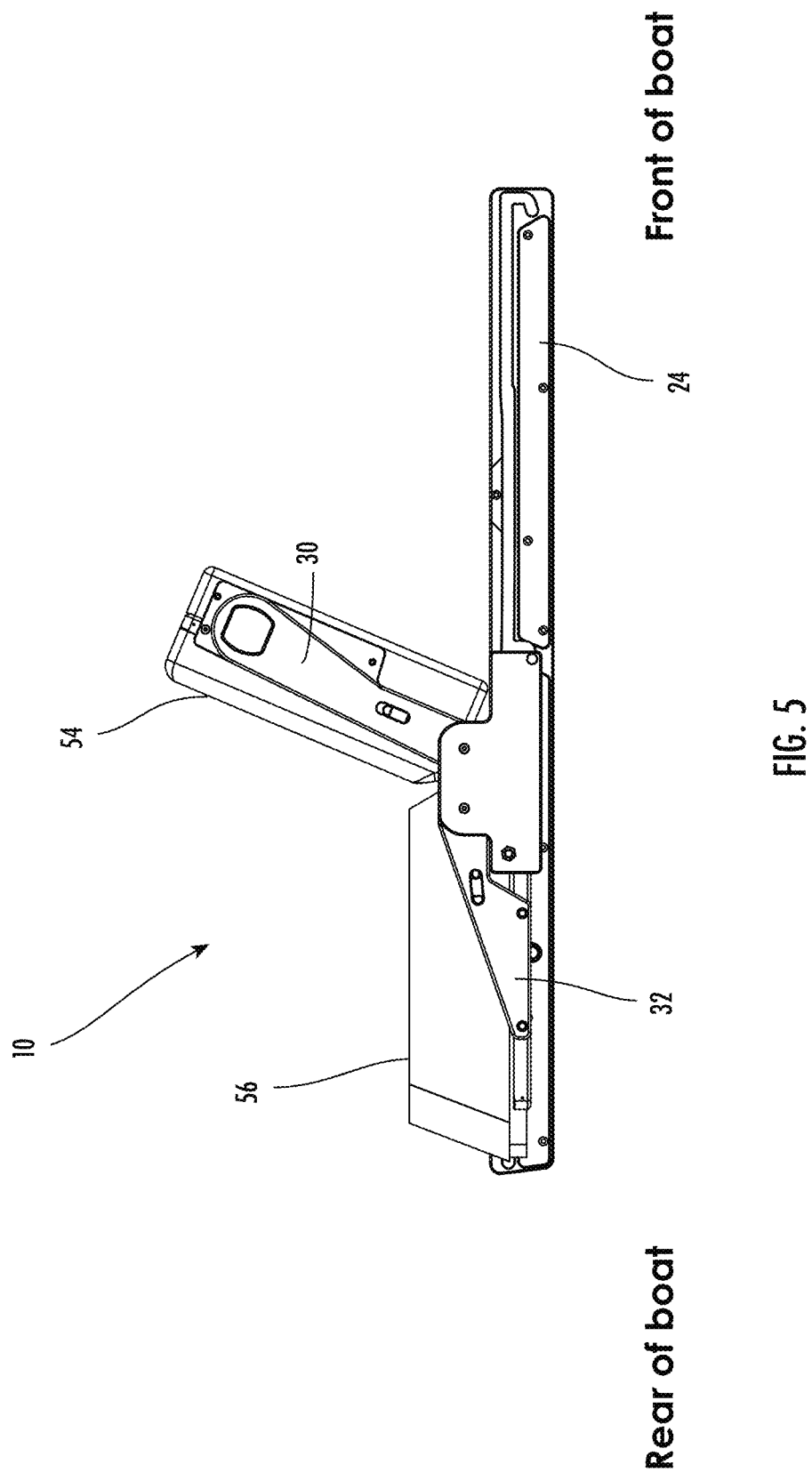
FIG. 5 shows a side view of a configurable seat in a rear-facing arrangement according to one aspect of the present disclosure.

With further reference to FIG. 3, the port base bracket 24 and the starboard base bracket 26 each include a first pivot arm 30 and a second pivot arm 32. The first pivot arms 30 are pivotally attached to the port base bracket 24 and the starboard base bracket 26, respectively, such that the first pivot arms 30 pivot between a forward position, as shown in FIG. 3, and an upright position, as shown in FIG. 5. In the forward position, each of the first pivot arms 30 pivots relative to the port base bracket 24 and the starboard base bracket 26 such that the first pivot arm 30 is folded substantially flat towards a front of the vehicle 12 and has a longitudinal axis that is substantially parallel to the longitudinal centerline of the elongated track. When in the forward position, the first pivot arm 30 may rest against at least a portion of the respective of the port base bracket 24 and the starboard base bracket 26. The port base bracket 24 and the starboard base bracket 26 may include a first stop portion 34 against which the first pivot arm 30 may rest against when in the forward position. In the upright position, each of the first pivot arms 30 is oriented substantially upright relative to the port base bracket 24 and the starboard base bracket 26, and the longitudinal axis of the first pivot arm 30 forms at an oblique angle with the longitudinal centerline, such that the first pivot arm 30 may support a cushion such as a backrest, as discussed in greater detail below. The first pivot arm 30 may further include a first pivot arm latch 36 that releasably secures the first pivot arm 30 in either of the upright position or the forward position, as discussed in greater detail herein.

The second pivot arms 32 are pivotally attached to the port base bracket 24 and the starboard base bracket 26, respectively. Each of the second pivot arms 32 is pivotally attached to the port base bracket 24 and the starboard base bracket 26 such that the second pivot arm 32 pivots between a rearward position (FIG. 5) and an upright position, as shown in FIG. 3. In the rearward position, the second pivot arm 32 pivots relative to the port base bracket 24 and the starboard base bracket 26 such that the second pivot arm 32 is folded substantially flat towards a rear of the vehicle 12 and has a longitudinal axis that is substantially parallel to the longitudinal centerline of the elongated track. When in the rearward position, the second pivot arm 32 may rest against at least a portion of the respective port base bracket 24 and the starboard base bracket 26. The port base bracket 24 and the starboard base bracket 26 may include a second stop portion 38 against which the second pivot arm 32 may rest against when in the rearward position. In the upright position, the second pivot arm 32 is oriented substantially upright relative to the port base bracket 24 and the starboard base bracket 26, and the longitudinal axis of the second pivot arm 32 forms at an oblique angle with the longitudinal centerline, such that the second pivot arm 32 may support a cushion as a backrest, as discussed in greater detail below. The second pivot arm 32 may further include a second pivot arm latch 40 that releasably secures the second pivot arm 32 in either of the upright position or the rearward position.

The first pivot arm 30 of the port base bracket 24 and the starboard base bracket 26 may support a first cushion frame 42. The first cushion frame 42 may be rotatably mounted on the first pivot arm 30 towards a distal end of the first pivot arm 30. The first cushion frame 42 may be rotatably mounted on the first pivot arm 30 such that the first cushion frame 42 may rotate relative to the first pivot arm 30. The first cushion frame 42 may further include a first cushion release assembly 46 to secure the first cushion frame 42 in a desired position relative to the first pivot arm 30. The first cushion release assembly 46 may include a knob 48 located towards a center of the first cushion frame 42. One or more cables 50 may be connected between the knob 48 and one or more cushion latches 52 located on the first cushion frame 42. The one or more cushion latches 52 may be located such that the one or more cushion latches 52 may engage a portion of the first pivot arm 30 to prevent the first cushion frame 42 from rotating relative to the first pivot arm 30. When the knob 48 is actuated, the one or more cables 50 may cause the one or more cushion latches 52 to disengage from the first pivot arm 30 to allow the first cushion frame 42 to rotate relative to the first pivot arm 30. The second pivot arm 32 of the port base bracket 24 and the starboard base bracket 26 may support a second cushion frame 44. The second cushion frame 44 may be in a fixed position relative to the second pivot arm 32.

Referring to FIG. 2, the seat 10 may include a first cushion 54 that is mounted on the first cushion frame 42 and a second cushion 56 that is mounted on the second cushion frame 44. The first cushion 54 may be located forward on the seat 10 relative to the vehicle 12 and the second cushion 56 may be located rearward on the seat 10 relative to the vehicle 12. The first cushion 54 and the second cushion 56 may be formed such that the first cushion 54 and the second cushion 56 may support a passenger thereon wherein each of the first cushion 54 and the second cushion 56 may support a passenger as either a backrest or a seat cushion depending on a configuration of the seat 10 as discussed in greater detail below.

Figure 4:
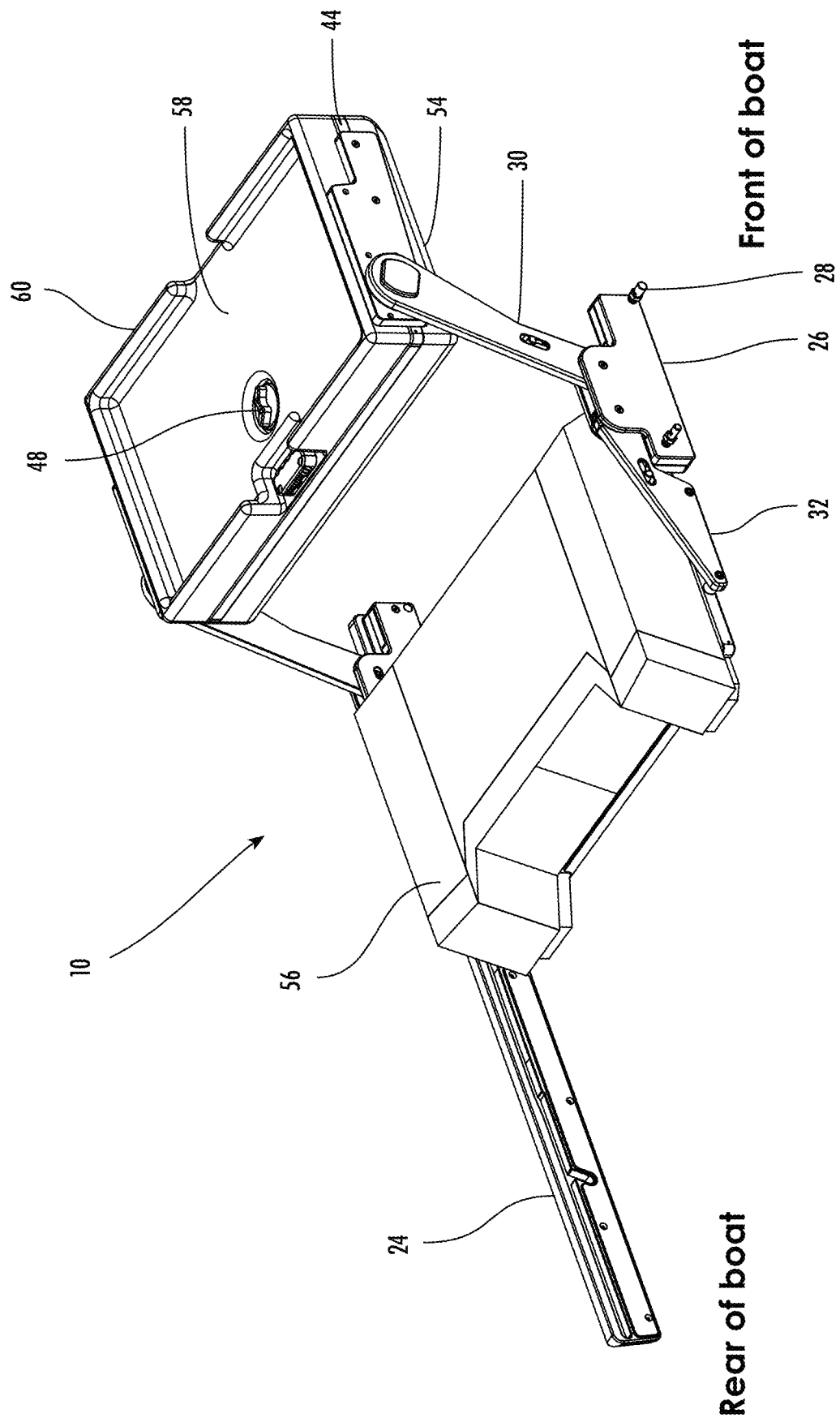
FIG. 4 shows a perspective view of a configurable seat with a table in an upward-facing orientation according to one aspect of the present disclosure.

As shown in FIG. 4, the seat 10 may further include a table 58 located on the first cushion frame 42 opposite of the first cushion 54. The table 58 includes a substantially solid surface and may include a lip 60 formed substantially around outer edges of the table 58. The table 58 may be located opposite of the first cushion 54 and may be oriented such that the table 58 is substantially flat when the seat 10 is in one of a plurality of configurations as described herein.

The seat 10 is capable of being configured in a plurality of configurations or positions on the vehicle 12. For example, FIG. 2 shows the seat 10 in a forward-facing configuration. In the forward-facing configuration, the first pivot arm 30 is in the forward position such that the first cushion 54 is in a substantially horizontal and flat orientation such that a passenger may be seated on the first cushion 54. In the forward-facing configuration, the second pivot arm 32 is substantially upright such that the second cushion 56 may be used as a backrest for a passenger.

FIG. 5 shows the seat 10 in a rear-facing configuration. In the rear-facing configuration, the first pivot arm 30 and the first cushion 54 are in an upright position such that the first cushion 54 may be used as a backrest for a passenger on the vehicle 12. In the rear-facing configuration, the second pivot arm 32 may be in a rearward position such that the second cushion 56 is in a substantially horizontal and flat orientation such that a passenger may be seated on the second cushion 56. In the rear-facing configuration, the port base bracket 24 and the starboard base bracket 26 may be slidably adjusted along the port guide track 14 and the starboard guide track 16 such that the port base bracket 24 and the starboard base bracket 26 are moved forward to allow the second cushion 56 to be laid substantially flat.

Figure 6:
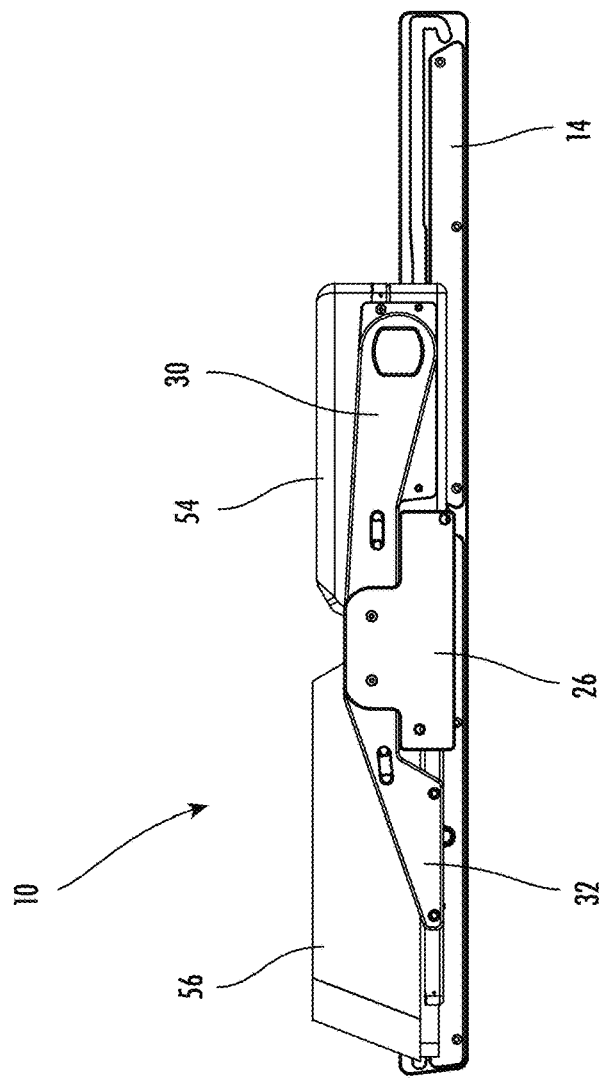
FIG. 6 shows a side view of a configurable seat in a flat arrangement according to one aspect of the present disclosure.

FIG. 6 shows the seat 10 in a flat configuration. In the flat configuration the first pivot arm 30 is in the forward position such that the first cushion 54 is substantially horizontal and flat. The second pivot arm second pivot arm 32 is in the rearward position such that the second cushion 56 is substantially horizontal and flat and such that a surface of the second cushion 56 is substantially aligned with a surface of the first cushion 54. In the flat configuration the first cushion 54 and the second cushion 56 are substantially flat such that the seat 10 creates a flat surface for a passenger to rest on the vehicle 12.

Figure 7:
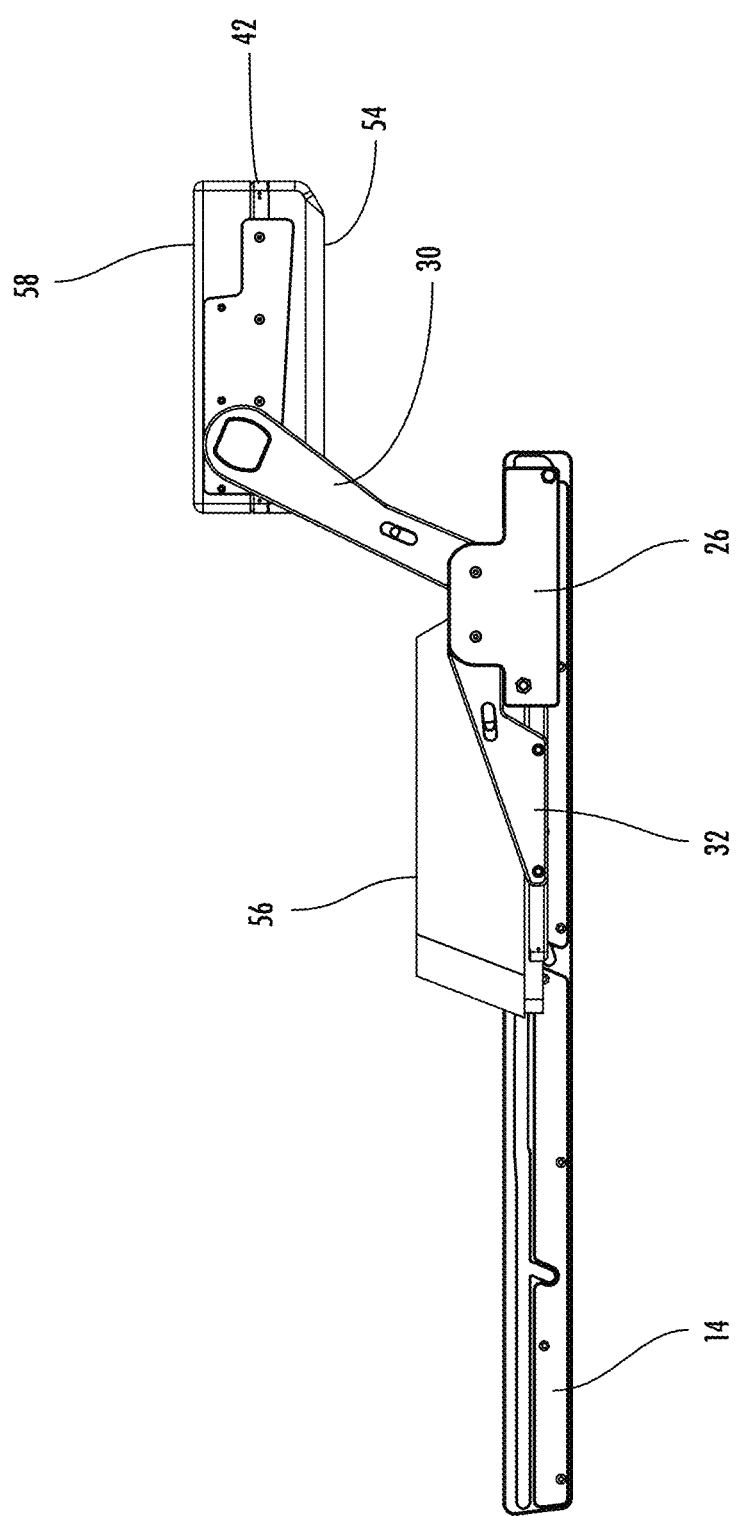
FIG. 7 shows a side view of a configurable seat with a table in an upward-facing orientation according to one aspect of the present disclosure.
Figure 8:
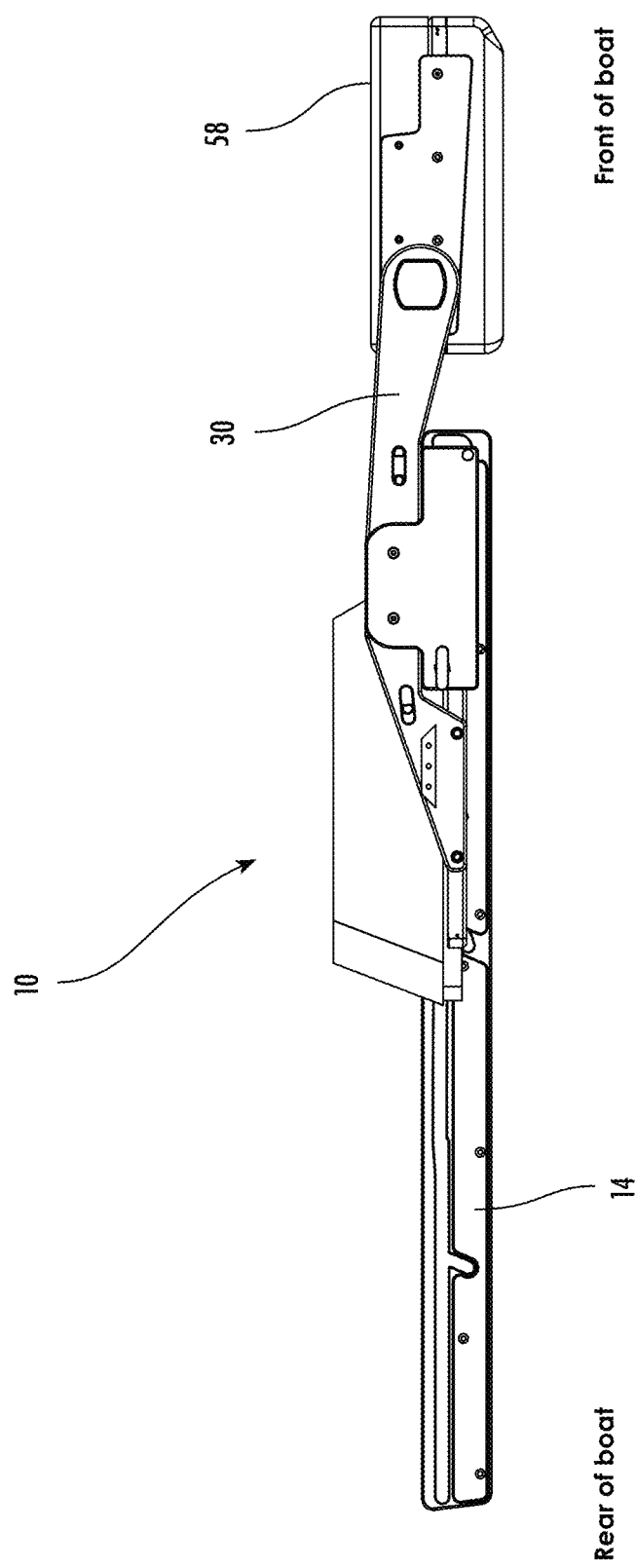
FIG. 8 shows a side view of a configurable seat with a table in an upward-facing orientation according to one aspect of the present disclosure.

As shown in FIG. 4 and FIG. 7, the seat 10 may be configured such that the table 58 is upright relative to the seat 10. The first pivot arm 30 may be in the upright position and the first cushion frame 42 may be rotated on the first pivot arm 30 such that the table 58 faces upward. The second pivot arm 32 may be in the rearward position such that the first cushion 54 is substantially flat such that a passenger may be seated thereon. Referring to FIG. 8, the first pivot arm 30 may also be in the forward position with the table 58 facing upwards such that the table 58 may be used for passengers with the first pivot arm 30 in the lower forward position.

Figure 9:
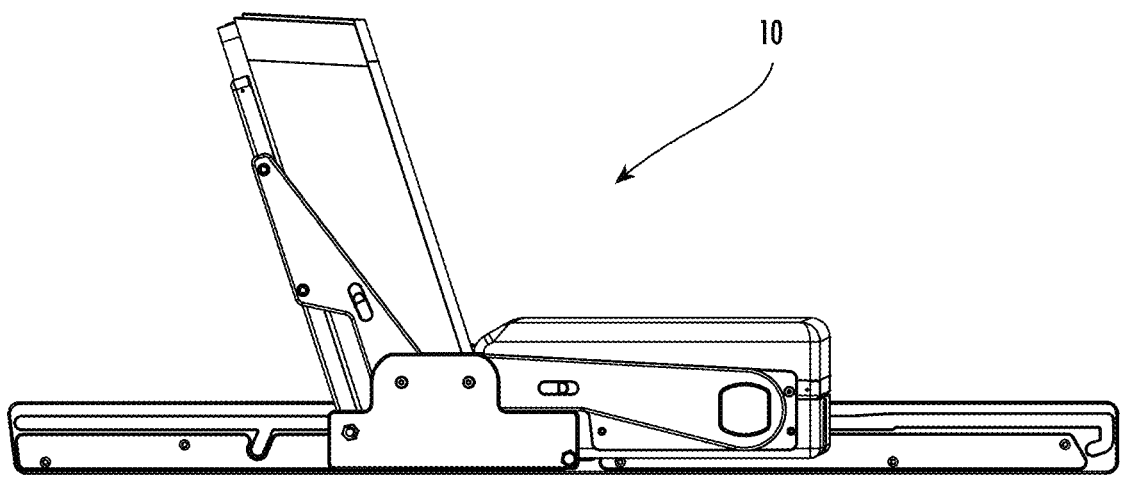
FIG. 9 shows a side view of a configurable seat in one position according to one aspect of the present disclosure.
Figure 10:
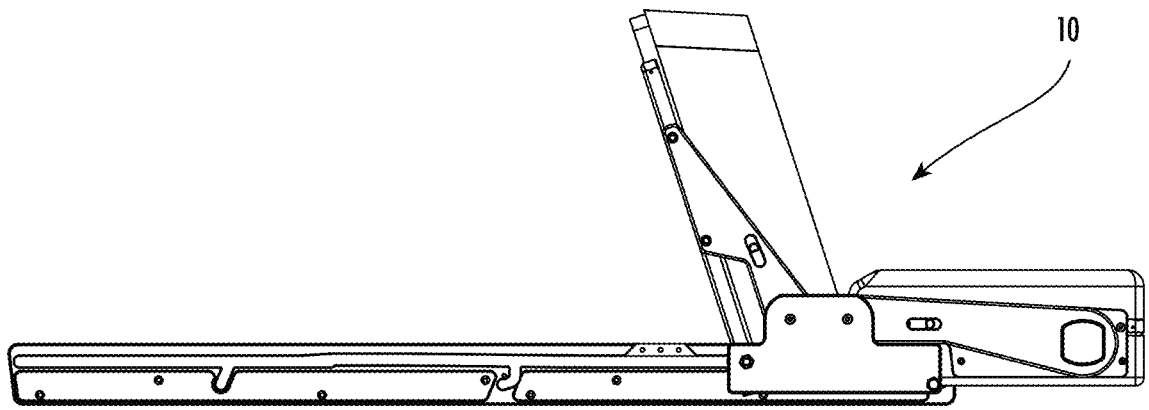
FIG. 10 shows a side view of a configurable seat in another position according to one aspect of the present disclosure.
Figure 11:
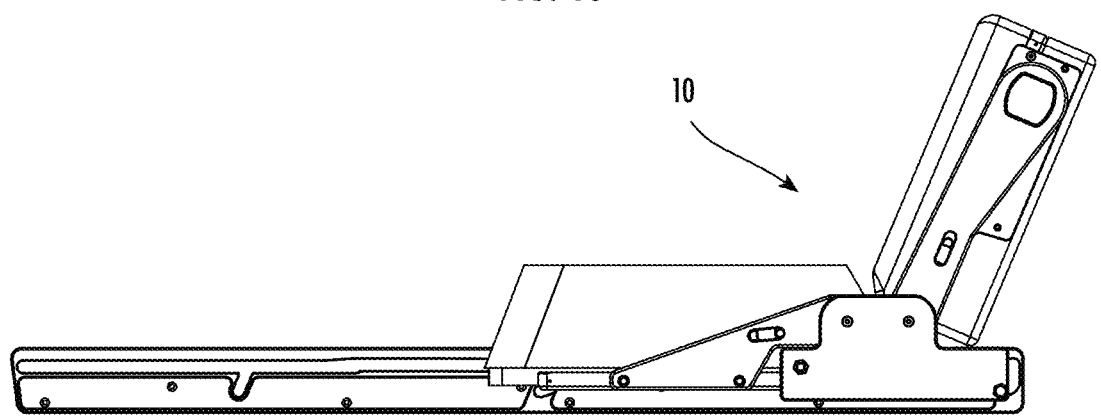
FIG. 11 shows a side view of a configurable seat in another position according to one aspect of the present disclosure.

The seat 10 may be arranged such that the port base bracket 24 and the starboard base bracket 26 may be slidably adjusted along lengths of the port guide track 14 and the starboard guide track 16. The port base bracket 24 and the starboard base bracket 26 may be slidably adjusted along lengths of the port guide track 14 and the starboard guide track 16, respectively, such that one of the guide pins 28 may be engaged with the notches 20 located along lengths of the port guide track 14 and the starboard guide track 16. As shown in FIG. 9, FIG. 10, and FIG. 11, the seat 10 may be configured such the seat 10 is in the forward-facing position or rear-facing position at various points along lengths of the port guide track 14 and the starboard guide track 16.

Figure 12:
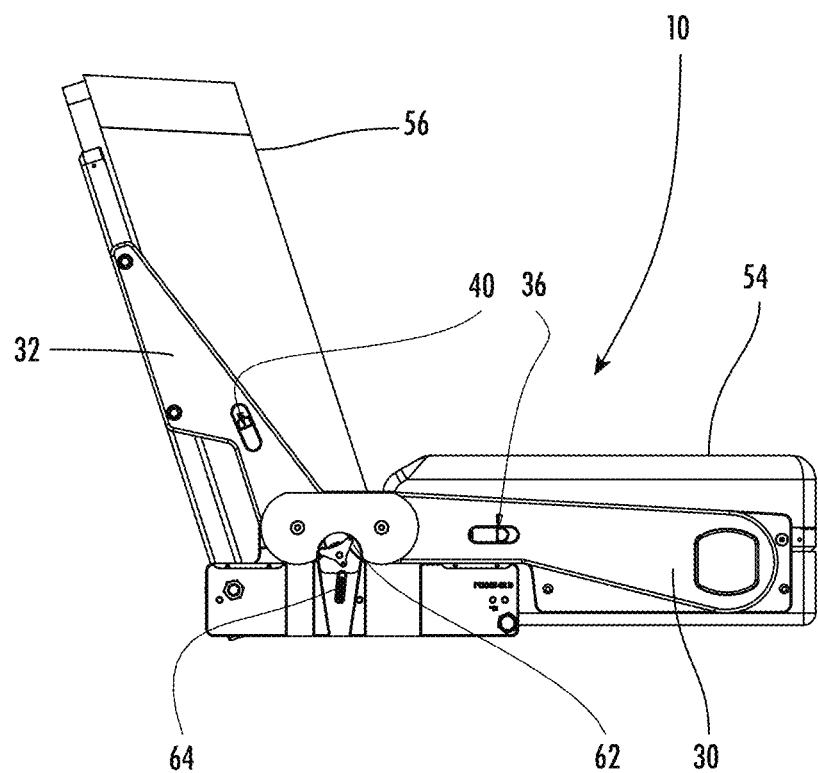
FIG. 12 shows a side view of a configurable seat including a toggle according to one aspect of the present disclosure.

Referring to FIG. 12, the seat 10 may further include a toggle 62 that maintains the first cushion 54 and the second cushion 56 in the various configurations described herein. The toggle 62 may be located at the port base bracket 24 and the starboard base bracket 26. The toggle 62 may include a spring 64 coupled with the toggle 62. The toggle 62 may be pivotally mounted on one or both of the port base bracket 24 and the starboard base bracket 26. The toggle 62 may releasably engage the first pivot arm 30 and the second pivot arm 32 to secure the first pivot arm 30 and the second pivot arm 32 in various desired positions on the port base bracket 24 and the starboard base bracket 26.

Figure 13:
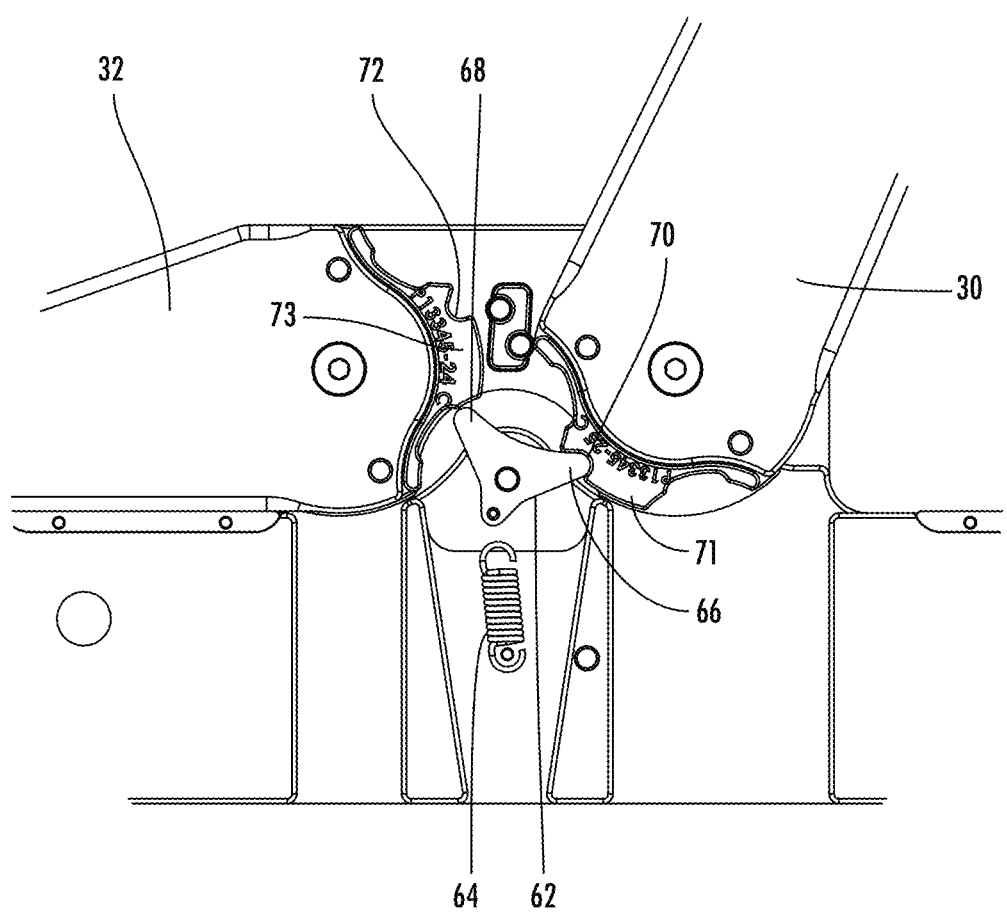
FIG. 13 shows a cutaway view of a toggle of a seat according to one aspect of the present disclosure.

FIG. 13 shows a cutaway view of the toggle 62. The toggle 62 is shaped such that the toggle 62 includes a first projecting portion 66 and a second projecting portion 68. The first projecting portion 66 and the second projecting portion 68 are shaped to engage a first directional indentation 70 and a second directional indentation 72. The first directional indentation 70 is formed on an end of the first pivot arm 30 and the second directional indentation 72 is formed on an end of the second pivot arm 32. The first directional indentation 70 may be formed in a first arm tab 71 and the second directional indentation 72 may be formed in a second arm tab 73.

As shown in FIG. 13, when the first arm 30 is in the upright position, the first projecting portion 66 engages the first directional indentation 70 such that the first pivot arm is substantially prevented from rotating to the forward position. The second projecting portion 68 may be in a position such that the second pivot arm 32 is prevented from moving toward the upright position by the second directional indentation 72 which contacts the second projecting portion 68.

Figure 14:
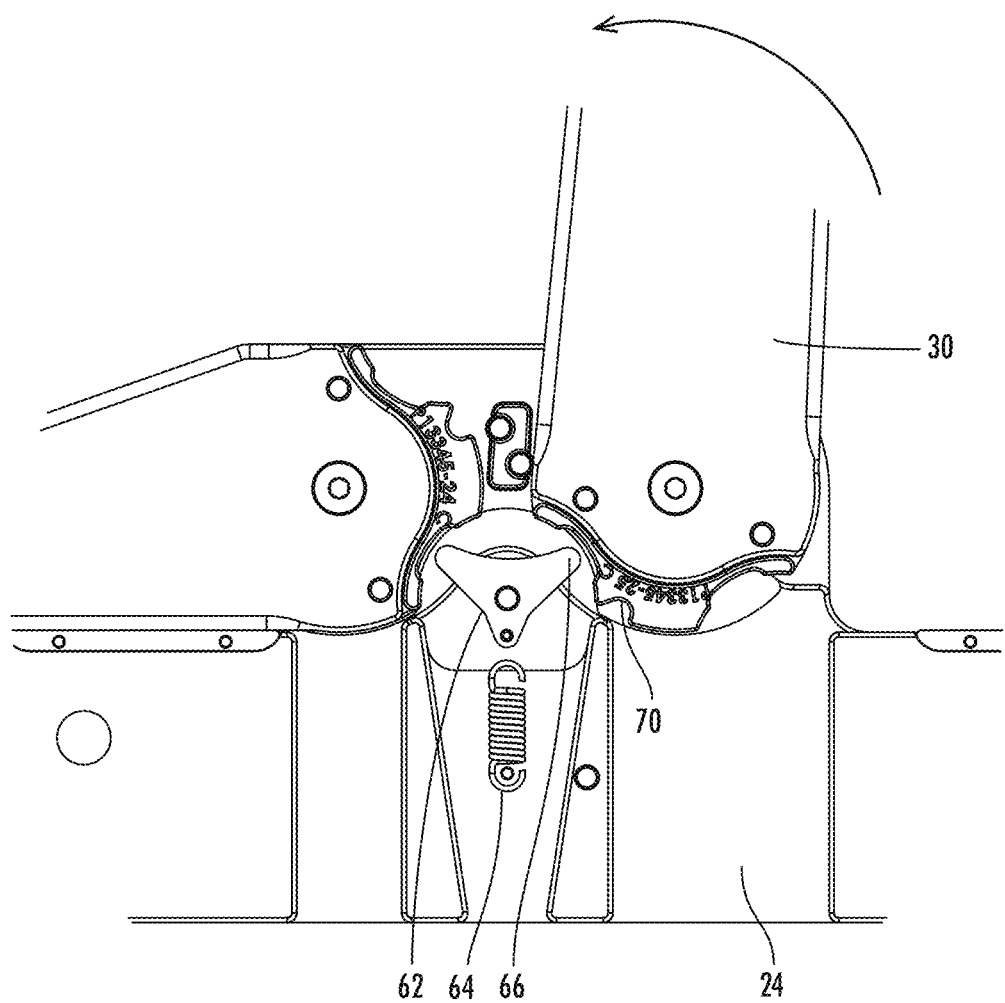
FIG. 14 shows a cutaway view of a toggle of a seat according to one aspect of the present disclosure.
Figure 15:
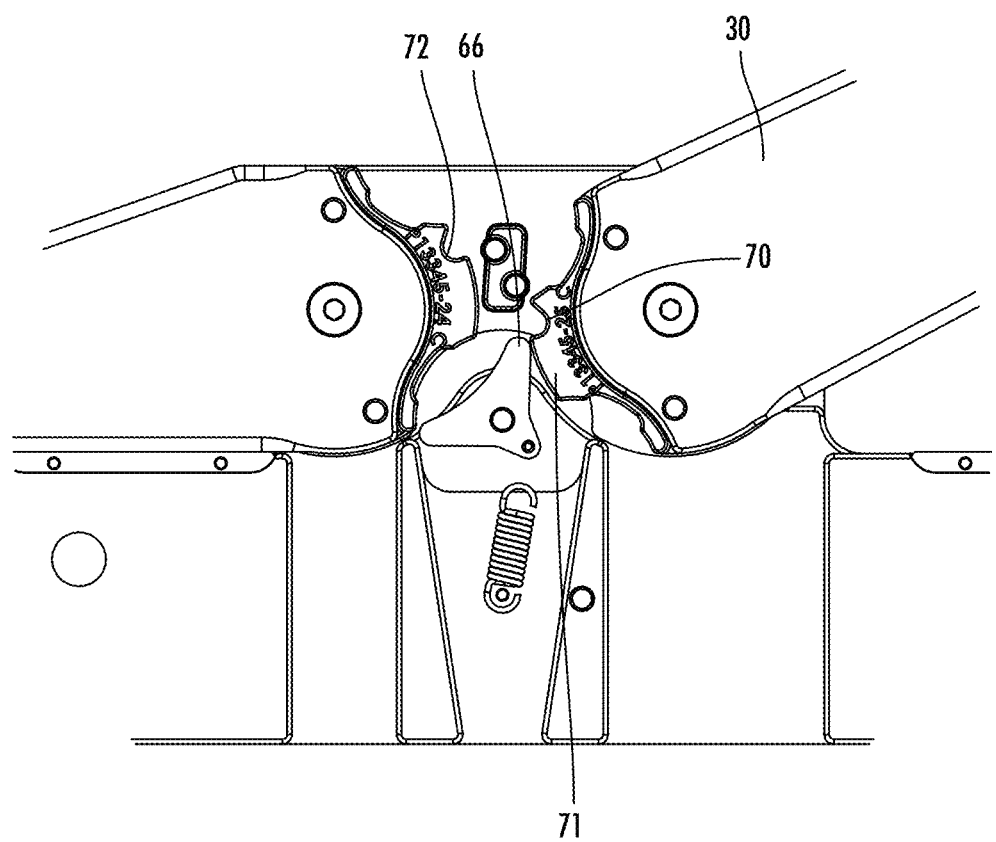
FIG. 15 shows a cutaway view of a toggle of a seat according to one aspect of the present disclosure.
Figure 16:
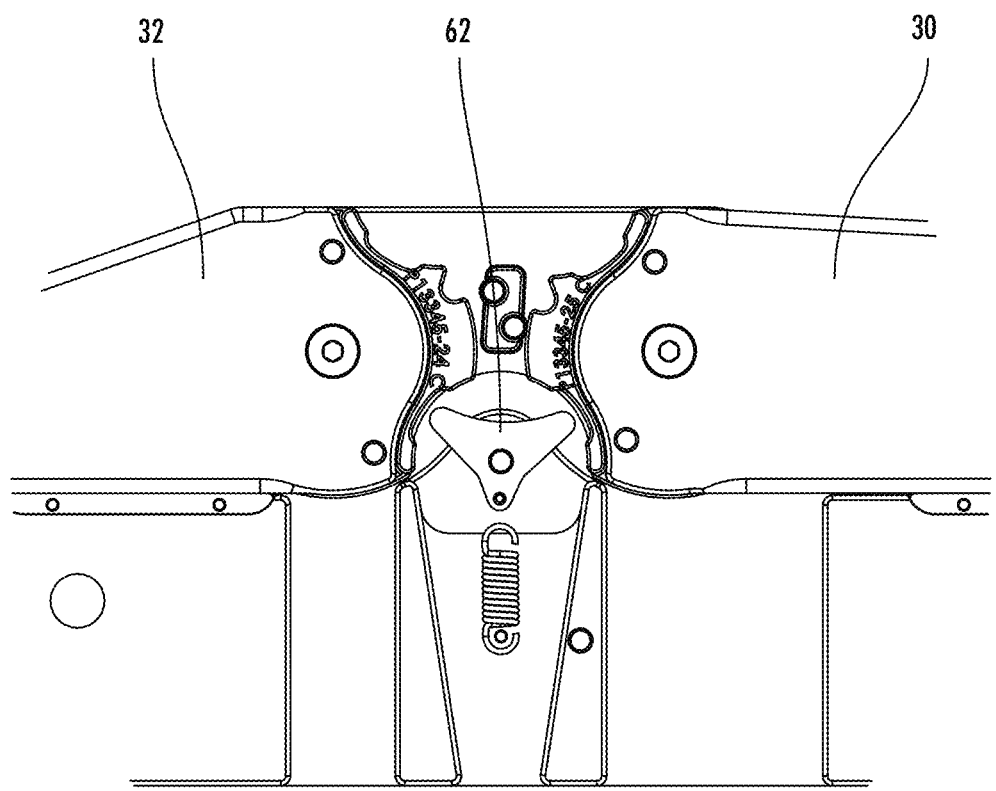
FIG. 16 shows a cutaway view of a toggle of a seat according to one aspect of the present disclosure.

Referring to FIG. 14, to move the first pivot arm 30 from the upright position to the forward position, the first pivot arm 30 is first rotated upward or counterclockwise relative to the port base bracket 24. The first projecting portion 66 is disengaged from the first directional indentation 70 and the spring 64 returns the toggle 62 to a neutral position. The first pivot arm 30 is then rotated towards the forward position, as shown in FIG. 15. The first arm tab 71 contacts the first projecting portion 66, thereby rotating the toggle 62 counterclockwise. When the toggle 62 is rotated, the first projecting portion 66 is oriented such that the first projecting portion 66 does not engage the first directional indentation 70, thereby allowing the first pivot arm 30 to rotate to the forward position as shown in FIG. 16. When the first pivot arm 30 is in the forward position and the second pivot arm 32 is in the rearward position as shown in FIG. 16, either of the first pivot arm 30 or the second pivot arm 32 may be moved to upright positions.

It should be noted that, while the above paragraphs describing the mechanisms of FIGS. 13-16 are referring to the movement of the first pivot arm, it should be understood that a similar description describes the movement of the second pivot arm with respect to the second pivot arm's interaction with the toggle 62.

Figure 17:
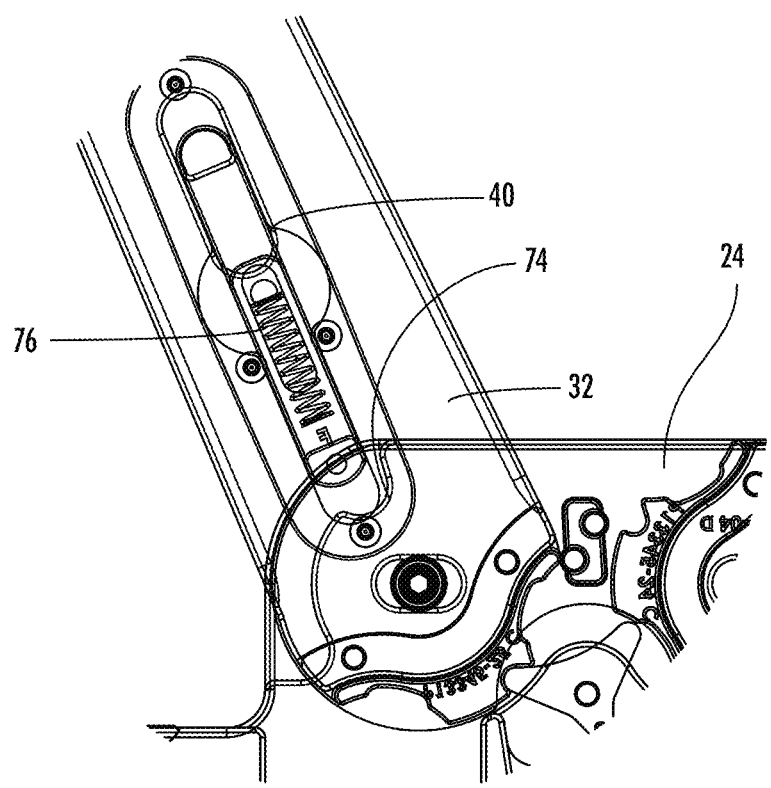
FIG. 17 shows a cutaway view of a latch of a seat according to one aspect of the present disclosure.

Referring to FIG. 17, when the first pivot arm 30 and the second pivot arm 32 are in the upright position, the first pivot arm latch 36 and the second pivot arm latch 40 secure the respective first pivot arm 30 and the second pivot arm 32 in the upright position to prevent the first pivot arm 30 and the second pivot arm 32 from moving from the upright position, such as when the seat 10 is in use by a passenger. FIG. 17 shows a cutaway view of the second pivot arm latch 40, with the first pivot arm latch 36 being substantially the same with respect to the first pivot arm 30. The second pivot arm latch 40 is slidably located on the second pivot arm 32 and is shaped to engage a latch indentation 74 on the port base bracket 24. The second pivot arm latch 40 may be biased towards a latched position wherein the second pivot arm latch 40 is engaged with the latch indentation 74 with a latch spring 76. When the second pivot arm latch 40 is engaged with the latch indentation 74, the second pivot arm 32 is prevented from moving from the upright position. The second pivot arm latch 40 may be engaged such that the second pivot arm latch 40 is disengaged from the latch indentation 74, thereby allowing the second pivot arm 32 to rotate or pivot with respect to the port base bracket 24.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A seat comprising:
    a guide track including an elongated track having a longitudinal centerline and one or more notches;
    a base bracket including at least one laterally extending guide pin slidingly engaging the elongated track and disposable within the one or more notches;
    a first pivot arm configured to support a forward cushion, the first pivot arm being rotatably coupled to the base bracket and movable between an upright position and a forward position, wherein a longitudinal axis of the first pivot arm forms an oblique angle with the longitudinal centerline in the upright position and is substantially parallel to the longitudinal centerline in the forward position; and
    a second pivot arm configured to support a rearward cushion, the second pivot arm being rotatably coupled to the base bracket and movable between an upright position and a rearward position, wherein a longitudinal axis of the first pivot arm forms an oblique angle with the longitudinal centerline in the upright position and is substantially parallel to the longitudinal centerline in the rearward position.

2. The seat of claim 1, wherein the guide track is a first guide track and the base bracket is a first base bracket, the seat further comprising a second guide track and a second base bracket.

3. The seat of claim 1, wherein the at least one laterally extending guide pin comprises at least two laterally extending guide pin.

4. The seat of claim 3, wherein the at least two laterally extending pins are offset in a direction perpendicular to the longitudinal centerline.

5. The seat of claim 1, further comprising a stop portion to prevent one of the first pivot arm or the second pivot arm from rotating beyond the forward position or the rearward position, respectively.

6. The seat of claim 5, wherein the stop portion is defined by the base bracket.

7. The seat of claim 1, wherein the one or more notches comprises two or more notches.

8. The seat of claim 1, wherein the elongated track is a channel defined by the guide track.

9. The seat of claim 1, wherein the forward cushion is rotatably supported by the first pivot arm, wherein the forward cushion includes a cushioned surface and a table surface opposite the cushioned surface.

10. The seat of claim 9, wherein the table surface includes a lip extending at least partially around an outer edge of the table surface.

11. The seat of claim 9, wherein the table surface comprises a substantially solid surface.

12. The seat of claim 9, further comprising a cushion release assembly movable between a locked position and an unlocked position, wherein the forward cushion is prevented from rotating relative to the first pivot arm in the locked position, wherein the forward cushion is allowed to rotate relative to the first pivot arm in the unlocked position.

13. The seat of claim 12, wherein the cushion release assembly includes a rotatable knob coupled to a cushion latch by a cable, wherein the cushion latch is engaged with the first pivot arm in the locked position, wherein the cushion latch is disengaged with the first pivot arm in the unlocked position, wherein rotation of the knob causes the cushion release assembly to move between the locked position and the unlocked position.

14. The seat of claim 1, further comprising a toggle assembly for releasably maintaining the first pivot arm and the second pivot arm in a position.

15. The seat of claim 14, wherein the toggle assembly includes a rotatable toggle and a spring force for biasing the toggle to a neutral position, wherein the toggle is urgable in either rotational direction.

16. The seat of claim 14, wherein each of the first pivot arm and the second pivot arm define an indentation for engaging the toggle to retain the first pivot arm or the second pivot arm in the upright position.

17. The seat of claim 14, wherein rotation of one of the first pivot arm or the second pivot arm beyond the upright position moves the toggle assembly from a locked position to an unlocked position, wherein the one of the first pivot arm or the second pivot arm is prevented from rotating toward the forward position or the rearward position, respectively, relative to the base bracket in the locked position, wherein the one of the first pivot arm or the second pivot arm is allowed to rotate toward the forward position or the rearward position, respectively, relative to the base bracket in the unlocked position.

18. The seat of claim 14, wherein, when one of the first pivot arm or second pivot arm is in the upright position, the toggle assembly prevents the other of the second pivot arm or the first pivot arm from rotating toward the upright position.

19. The seat of claim 14, further comprising a pivot arm latch movable between a locked position and an unlocked position, wherein the first pivot arm or the second pivot arm is prevented from rotating relative to the base bracket in the locked position, wherein the first pivot arm or the second pivot arm is allowed to rotate relative to the base bracket in the unlocked position.

20. The seat of claim 1, wherein, when one of the first pivot arm or second pivot arm is in the upright position, the other of the second pivot arm or the first pivot arm is prevented from rotating toward the upright position.

* * * * *